(12) United States Patent
Glasberg

(10) Patent No.: US 7,917,437 B1
(45) Date of Patent: Mar. 29, 2011

(54) METHOD FOR AVOIDING INTERMEDIATED PAYMENT AGGREGATION

(76) Inventor: Marcelo Glasberg, Rio de Janeiro (BR)

( * ) Notice: Subject to any disclaimer, the term of this patent is extended or adjusted under 35 U.S.C. 154(b) by 45 days.

(21) Appl. No.: 12/650,867

(22) Filed: Dec. 31, 2009

(51) Int. Cl.
*G06Q 40/00* (2006.01)
(52) U.S. Cl. .......................... 705/40; 705/39
(58) Field of Classification Search .................. None
See application file for complete search history.

(56) References Cited

U.S. PATENT DOCUMENTS

| | | | |
|---|---|---|---|
| 5,978,780 A | | 11/1999 | Watson |
| 6,128,603 A | * | 10/2000 | Dent et al. ................ 705/40 |
| 2002/0116331 A1 | * | 8/2002 | Cataline et al. ............ 705/39 |
| 2004/0199475 A1 | * | 10/2004 | Rivest et al. .............. 705/67 |
| 2004/0215560 A1 | * | 10/2004 | Amalraj et al. ............ 705/40 |

OTHER PUBLICATIONS

"Peppercoin Introduces Version 2.0 of Its Next-Generation Small Pyament Service", Business Wire, New York, Jun. 28, 2004, p. 1.*

* cited by examiner

*Primary Examiner* — M. Thein

(57) ABSTRACT

A computer-implemented method, in different embodiments, is provided to construct on-line payments without resorting to aggregation. The embodiments permit smaller total fees, permit the intermediary payment system to intermediate payments without holding third-party funds, and permit eliminating or reducing chargeback liability. In one embodiment, an intermediary payment system maintains records of unpaid amounts for potential receivers, and determines one or more potential receivers, but not all of them, to become effective receivers of a nominal amount. The primary payment system transfers amounts from the user and to receivers. The intermediary payment system reduces records of unpaid amounts for effective receiver, and raises records of unpaid amounts for potential receivers.

12 Claims, 11 Drawing Sheets

| | IPS (R0) | R1 | R2 | R3 | R4 | R5 | R6 | R7 | R8 | R9 |
|---|---|---|---|---|---|---|---|---|---|---|
| Transaction 1 403 | | | | | | | | | 412 | |
| Nominal amount: $1.10 406 | first 0.17 | first 0.69 | first - | first - | first - | first - | first - | first - | first 0.24 | first - |
| | unpaid 0.17 | unpaid -0.41 | unpaid 0.00 | unpaid 0.00 | unpaid 0.00 | unpaid 0.00 | unpaid 0.00 | unpaid 0.00 | unpaid 0.24 | unpaid 0.00 |
| R0 (15 %) = $0.17<br>R1 (63 %) = $0.69<br>R8 (22 %) = $0.24<br>402 401 405 | paid 0.00 | paid 1.10 407 | paid 0.00 | paid 0.00 | paid 0.00 | paid 0.00 | paid 0.00 | paid 0.00 | paid 0.00 | paid 0.00 |
| Transaction 2 411 | | | | | | | | | | |
| Nominal amount: $1.20 414 | first 0.35 | first -0.06 | first - | first 0.11 | first - | first 0.33 | first - | first - | first 0.47 | first - |
| | unpaid 0.35 | unpaid -0.06 | unpaid 0.00 | unpaid 0.11 | unpaid 0.00 | unpaid 0.33 | unpaid 0.00 | unpaid 0.00 | unpaid -0.73 | unpaid 0.00 |
| R0 (15 %) = $0.18<br>R1 (28 %) = $0.35<br>R3 (9 %) = $0.11<br>R5 (29 %) = $0.33<br>R8 (19 %) = $0.23<br>410 409 | paid 0.00 413 | paid 1.10 | paid 0.00 | paid 0.00 | paid 0.00 | paid 0.00 | paid 0.00 | paid 0.00 | paid 1.20 415 | paid 0.00 |

FIG. 4

| | IPS (R0) | R1 | R2 | R3 | R4 | R5 | R6 | R7 | R8 | R9 |
|---|---|---|---|---|---|---|---|---|---|---|
| | first 0.13 | first — | first — | first — | first -0.23 | first — | first — | first — | first -0.07 | first 0.08 |
| | unpaid -0.38 | unpaid 0.06 | unpaid 0.62 | unpaid -0.41 | unpaid -0.23 | unpaid 0.21 | unpaid -0.69 | unpaid 0.81 | unpaid -0.07 | unpaid 0.08 |
| | paid 796.20 | paid 506.20 | paid 520.90 | paid 472.00 | paid 494.50 | paid 530.00 | paid 515.40 | paid 514.70 | paid 505.90 | paid 449.70 |

Transaction 5000
Nominal amount: $0.30                                    500
Accum. amount:
$5305.50
R0 (15 %) = $0.09
R4 (19 %) = $0.11
R8 (31 %) = $0.19
R9 (35 %) = $0.21

| | IPS (R0) | R1 | R2 | R3 | R4 | R5 | R6 | R7 | R8 | R9 |
|---|---|---|---|---|---|---|---|---|---|---|
| | first 0.05 | first — | first — | first — | first 0.20 | first — | first — | first — | first — | first — |
| | unpaid 0.05 | unpaid 0.75 | unpaid 0.22 | unpaid 0.44 | unpaid -0.33 | unpaid 0.21 | unpaid -1.05 | unpaid -0.38 | unpaid -0.26 | unpaid 0.35 |
| | paid 796.63 | paid 506.89 | paid 520.50 | paid 472.85 | paid 494.40 | paid 530.00 | paid 515.04 | paid 513.51 | paid 505.71 | paid 449.97 |

Transaction 5000
Nominal amount: $1.70                                    501
Accum. amount:
$5305.50
R0 (15 %) = $0.26
R4 (85 %) = $1.45

| | IPS (R0) | R1 | R2 | R3 | R4 | R5 | R6 | R7 | R8 | R9 |
|---|---|---|---|---|---|---|---|---|---|---|
| | first -0.02 | first — | first — | first — | first — | first — | first — | first 0.12 | first -0.20 | first — |
| | unpaid -0.32 | unpaid -0.12 | unpaid 0.37 | unpaid 0.59 | unpaid 0.21 | unpaid -1.09 | unpaid 0.92 | unpaid -0.32 | unpaid -0.20 | unpaid -0.04 |
| | paid 796.26 | paid 506.02 | paid 520.65 | paid 473.00 | paid 494.94 | paid 528.70 | paid 517.01 | paid 513.57 | paid 505.77 | paid 449.58 |

Transaction 5000
Nominal amount: $0.40                                    502
Accum. amount:
$5305.50
R0 (15 %) = $0.06
R7 (28 %) = $0.11
R8 (57 %) = $0.23

FIG. 5

| | IPS (R0) | R1 | R2 | R3 | R4 | R5 | R6 | R7 | R8 | R9 |
|---|---|---|---|---|---|---|---|---|---|---|
| Transaction 3 <br> Nominal amount: $0.70 <br> R0 (15%) = $0.10 <br> R2 (13%) = $0.09 <br> R5 (23%) = $0.16 <br> R8 (49%) = $0.34 | first -2.02 <br> second -2.83 <br> unpaid -2.72 <br> paid 3.20 | first - <br> second - <br> unpaid 0.00 <br> paid 0.00 | first 0.70 <br> second -0.09 <br> unpaid 0.70 <br> paid 0.00 | first - <br> second - <br> unpaid 0.60 <br> paid 0.00 | first - <br> second - <br> unpaid 0.00 <br> paid 0.00 | first 0.16 <br> second -0.70 <br> unpaid 0.16 <br> paid 0.00 | first - <br> second - <br> unpaid 0.25 <br> paid 0.00 | first - <br> second - <br> unpaid 0.07 <br> paid 0.00 | first 0.34 <br> second -0.70 <br> unpaid 0.34 <br> paid 0.00 | first - <br> second - <br> unpaid 0.59 <br> paid 0.00 |
| Transaction 4 <br> Nominal amount: $0.50 <br> R0 (15%) = $0.07 <br> R6 (46%) = $0.23 <br> R8 (39%) = $0.20 | first -2.65 <br> second -3.22 <br> unpaid -3.15 <br> paid 3.70 | first - <br> second - <br> unpaid 0.00 <br> paid 0.00 | first - <br> second - <br> unpaid 0.70 <br> paid 0.00 | first - <br> second - <br> unpaid 0.60 <br> paid 0.00 | first - <br> second - <br> unpaid 0.00 <br> paid 0.00 | first - <br> second - <br> unpaid 0.16 <br> paid 0.00 | first 0.48 <br> second -0.25 <br> unpaid 0.48 <br> paid 0.00 | first - <br> second - <br> unpaid 0.07 <br> paid 0.00 | first 0.54 <br> second -0.16 <br> unpaid 0.54 <br> paid 0.00 | first - <br> second - <br> unpaid 0.59 <br> paid 0.00 |

FIG. 6

| | IPS (R0) | R1 | R2 | R3 | R4 | R5 | R6 | R7 | R8 | R9 |
|---|---|---|---|---|---|---|---|---|---|---|
| Transaction 5000 | first -15.57 | first - | first - | first - | first 0.47 | first - | first - | first - | first 0.89 | first 2.06 |
| Nominal amount: $0.30 | second -15.87 | second - | second - | second - | second 0.86 | second - | second - | second - | second 1.27 | second -1.30 |
| Accum. amount: $5305.50 | unpaid -15.57 | unpaid 2.20 | unpaid 2.25 | unpaid 2.22 | unpaid 0.47 | unpaid 2.00 | unpaid 1.24 | unpaid 2.54 | unpaid 0.59 | unpaid 2.06 |
| 700 R0 (15 %) = $0.09<br>R4 (19 %) = $0.11<br>R8 (31 %) = $0.19<br>R9 (35 %) = $0.21 | paid 812.15 | paid 503.94 | paid 518.03 | paid 470.19 | paid 494.26 | paid 527.79 | paid 514.85 | paid 511.35 | paid 505.38 | paid 447.56 |
| Transaction 5000 | first -14.73 | first - | first - | first - | first 3.29 | first - | first - | first - | first - | first - |
| Nominal amount: $1.70 | second -15.62 | second - | second - | second - | second 0.79 | second - | second - | second - | second - | second - |
| Accum. amount: $5305.50 | unpaid -14.73 | unpaid 0.99 | unpaid 1.91 | unpaid 1.07 | unpaid 1.59 | unpaid 2.13 | unpaid 1.72 | unpaid 2.49 | unpaid 1.06 | unpaid 1.77 |
| 701 R0 (15 %) = $0.26<br>R4 (85 %) = $1.45 | paid 811.31 | paid 505.15 | paid 518.37 | paid 471.34 | paid 493.14 | paid 527.66 | paid 514.37 | paid 511.40 | paid 504.91 | paid 447.85 |
| Transaction 5000 | first -14.70 | first - | first - | first - | first - | first - | first - | first 1.44 | first 2.49 | first - |
| Nominal amount: $0.40 | second -15.34 | second - | second - | second - | second - | second - | second - | second -0.09 | second -0.74 | second - |
| Accum. amount: $5305.50 | unpaid -15.10 | unpaid 1.83 | unpaid 1.14 | unpaid 1.64 | unpaid 1.89 | unpaid 1.20 | unpaid 1.20 | unpaid 1.44 | unpaid 2.49 | unpaid 2.27 |
| 702 R0 (15 %) = $0.06<br>R7 (28 %) = $0.11<br>R8 (57 %) = $0.23 | paid 811.68 | paid 504.31 | paid 519.14 | paid 470.77 | paid 492.84 | paid 528.59 | paid 514.89 | paid 512.45 | paid 503.48 | paid 447.35 |

FIG. 7

```
<!DOCTYPE html>
<script src="http://jqueryjs.googlecode.com/files/jquery-1.3.2.min.js"></script>
<script>
var secure = true;      // Change between true or false: "safe" or "unsafe" calculation rule.
var numberVIPS = 10;    // Sets the total number of vendors and the Intermediary Payment System.
var totalLines = 100;   // Number of transactions to display.
var text = '';

for (var i=0; i<totalLines; i++) {
    text += '<div class="line" id="line' + i + '"> <div class="payment"> </div>';
    for (var j=0; j<numberVIPS; j++) text += ' <div class="r' + j + '"> </div>'
    text += '</div>'; } document.write(text);
var unpaidAmounts = new Array();
var paidAmounts = new Array();
for (var i=0; i<numberVIPS; i++) {
    unpaidAmounts[i] = 0;
    paidAmounts[i] = 0; } var LastUnpaidAmounts = unpaidAmounts;
var receivers = new Array();
var accumulatedAmount = 0;
$(function() { Calculate(); });

function NewReceiver(numberReceivers) {
    var candidate = Math.floor(Math.random()*numberVIPS);
    while (true) {
        var found = false;
        for (var i=0; i<numberReceivers; i++) if (receivers[i] == candidate) found = true;
        if (!found) return candidate;
        candidate = Math.floor(Math.random()*numberVIPS); } }
```

FIG. 8A

```
function IsReceiver(whichReceiver, numberReceivers) {
    for (var i=0; i<numberReceivers; i++) if (receivers[i] == whichReceiver) return true;
    return false; } function Calculate() {
    for (var line=0; line<totalLines; line++) {
        for (var j=0; j<numberVIPS; j++) receivers[j] = '';
        var totalAmount = Math.floor(Math.random()*20+1) / 10;
        totalAmount = (totalAmount.toFixed(2)*1);
        if (totalAmount < 0.2) totalAmount = 0.2;
        var numberReceivers = Math.floor(Math.random()*4+1)+1;
        receivers[0] = 0; // The Intermediary Payment System (IPS).
        for (var j=1; j<numberReceivers; j++) {
            receivers[j] = NewReceiver(numberReceivers); } var percents = new Array();
    var percentIPS = 15;
    var auxTotal = 0;

for (var j=1; j<numberReceivers; j++) {
        percents[j] = Math.random();
        auxTotal += percents[j]; } percents[0] = auxTotal * percentIPS / (100 - percentIPS); // Calculates the percentage of the IPS.
    auxTotal = auxTotal + percents[0]; // Calculates the other potential receivers.
    for (var j=0; j<numberReceivers; j++) percents[j] = Math.round(percents[j]/auxTotal*100);

var total = 0; // Fixes small rounding JavaScript problems.
    for (var j=0; j<numberReceivers; j++) total += percents[j];
    percents[numberReceivers-1] += 100 - total;

var nominalAmounts = new Array(); // Calculates nominal amounts.
    for (var j=0; j<numberReceivers; j++) nominalAmounts[j] = totalAmount * percents[j] / 100;
```

FIG. 8B

```
var firstResult = new Array();    // Calculates the theoretical unpaid amount if each receiver should receive...
var secondResult = new Array();   // ...its part of the present payment but didn't.
for (var i=0; i<numberVIPS; i++) {
    firstResult[i] = -1000000; secondResult[i] = -1000000; };

for (var j=0; j<numberReceivers; j++) {   // For each potential receiver, calculates its theoretical unpaid amount.
    var auxReceiver = receivers[j];       // Gets the receiver.

if (secure) secondResult[auxReceiver] = unpaidAmounts[auxReceiver] - totalAmount; // Calculates second result
    firstResult[auxReceiver] = unpaidAmounts[auxReceiver] + nominalAmounts[j]; }   // Calculates the first result.

var max = -1000000; var maxReceiver = -1;    // Gets the one with the largest unpaid firstResult.
for (var j=0; j<numberReceivers; j++) {
    var auxReceiver = receivers[j];          // Gets the receiver.

// Finds the highest theoretical unpaid amount. Note: For us to be secure (only if secure = true),
// we shouldn't pay an untrusted receiver more than it's resulting unpaid value.
// In this example the only trusted receiver is the IPS itself.
if ((firstResult[auxReceiver] > max) && (!secure || (secure && secondResult[auxReceiver] >= 0))) {
    max = firstResult[auxReceiver]; maxReceiver = auxReceiver; }; } if (maxReceiver == -1) maxReceiver = 0;    // If no Receiver was found, chooses the IPS.

for (var j=0; j<numberReceivers; j++) {   // For each receiver,
    var auxReceiver = receivers[j];       // Gets the receiver.
    unpaidAmounts[auxReceiver] += nominalAmounts[j];

if (maxReceiver == auxReceiver) {
        unpaidAmounts[auxReceiver] -= totalAmount; paidAmounts[auxReceiver] += totalAmount; } } for (var i=0; i<numberVIPS; i++) {    // Fixes JavaScript rounding problems.
    unpaidAmounts[i] = (unpaidAmounts[i].toFixed(6)) * 1; paidAmounts[i] = (paidAmounts[i].toFixed(6)) * 1; }
```

FIG. 8C

```
accumulatedAmount += totalAmount; accumulatedAmount = (accumulatedAmount.toFixed(6) * 1);
var text = 'Transaction ' + (line+1) + '<br>';
text += 'Amount = $' + totalAmount.toFixed(2) + " (" + accumulatedAmount.toFixed(2) + ")<br>";
text += numberReceivers + ' receivers:<br>';

for (var j=0; j<numberReceivers; j++) {
    text += '  R' + receivers[j] + " (" + percents[j] + " %) = $"
            + nominalAmounts[j].toFixed(2) + " <br>"; }
$line = $("#line" + line); $cell = $("div.payment", $line); $cell.html(text);

for (var j=0; j<numberVIPs; j++) { // For each receiver,
    $cell = $("div.r" + j, $line); text = "";
    var firstResultStr; if (firstResult[j] == -1000000) firstResultStr = "-";
    else firstResultStr = firstResult[j].toFixed(2);
    text += "first<br>" + firstResultStr + "<br> <br>";

if (secure) {
        var secondResultStr;
        if (secondResult[j] == -1000000) secondResultStr = "-";
        else secondResultStr = secondResult[j].toFixed(2);
        text += "second<br>" + secondResultStr + "<br> <br>"; } var unpaidAmountsStr = unpaidAmounts[j].toFixed(2);
    if (IsReceiver(j, numberReceivers)) unpaidAmountsStr= "<span class='unpaid'>" + unpaidAmountsStr + "</span>";
    text += "unpaid<br>" + unpaidAmountsStr + "<br> <br>";

var paidAmountsStr = paidAmounts[j].toFixed(2);
    if (j == maxReceiver) paidAmountsStr= "<span class='paid'>" + paidAmountsStr + "</span>";
    text += "paid<br>" + paidAmountsStr;
    $cell.html(text); } lastUnpaidAmounts = unpaidAmounts; // Remembers last transaction values.
} }; </script>
```

FIG. 8D

METHOD FOR AVOIDING INTERMEDIATED PAYMENT AGGREGATION

BACKGROUND

1. Field

This relates to the field of making payments via the Internet.

2. Prior Art

Commerce on the Internet includes the sale of physical and digital products and services. The total amount to be paid for a single commerce operation is composed of many smaller costs, such as the cost of shipping, the cost of a payment transaction, plus other costs. The term "payment transaction" includes the act of paying, when money is transferred from a user to one or more vendors, usually with the help of one or more brokers such as banks, a credit card company, or an online payment company. This money transfer usually costs something for the broker to perform, which is called the cost of the payment transaction.

When selling physical products, such as books or CDs, it is necessary for the vendor to ship them to the buyer. The cost of shipping usually sets a minimum cost for the whole commerce operation, so that the total amount that the buyer must pay will never get very small. As a result, the cost of the payment transaction itself becomes negligible in comparison, and is not a critical factor.

However, the selling of digital products or services, such as digital music or videos, can, in most cases, be completely fulfilled through the Internet, without any shipping costs. In this case, the total amount that the buyer must pay may indeed be very small, and the cost of the payment transaction is not negligible. As an example, it may be acceptable for a vendor to spend 20 cents to complete a 15-dollar sale, but it is unacceptable to spend 20 cents to complete a 25-cent sale. It becomes apparent that transaction costs must be kept very small.

Some payment systems, called "intermediary payment systems", work by letting a user pay vendors by using another payment system, called the "primary payment system". For example, PayPal (a company from San Jose, Calif.) allows users to pay with credit or debit cards for purchased goods or services. In this case, PayPal is the intermediary payment system, while the credit or debit card company (e.g., VISA or MasterCard) is the primary payment system. Therefore, PayPal is acting as an intermediary between users and vendors and the credit or debit card company. However, a company that serves as an intermediary in some cases can also become the primary payment system in other situations. For example, suppose a hypothetical company XYZ allows users to pay with PayPal for purchased goods or services. In this case, XYZ is the intermediary payment system, while PayPal becomes the primary payment system.

It is common that the primary payment system charges both a fixed fee and a variable fee to perform payments. For example, a primary payment system may charge a fee of 5 cents plus 5%. Then, for example, if a payment transfers 20 cents this would result in a fee of 6 cents, or 30% of the total. The intermediary payment system usually also charges a fee. If, for example, the intermediary payment system charges a 10% fee for acting as an intermediary for a 20 cent payment using the fee structure described above, it would be good if the user could be charged 5 cents plus 15% (5 cents plus 5% for the primary payment system and 10% for the intermediary payment system). This usually doesn't happen in practice because paying the intermediary payment system constitutes a separate payment that incurs separate fixed fees (i.e., the fixed fee will be charged twice). The total fee charged by the primary payment system for both payments would therefore be 11 cents, i.e., 55% of the original 20 cents, possibly rendering the payment impractical in economic terms.

Things further complicate when there is more than one vendor. For example, if a video website hosts a video created by a content producer, then both the website and the content producer may be considered vendors, and would probably split the payment. For example, the intermediary payment system could get 10%, the video website could get 20% and the content producer could get 70%. In this case, the total fee charged by the primary payment system for the three payment parts (or the three separate payments that compose a larger payment batch) would be 16 cents, i.e., 80% of the original 20 cents. If even more vendors are added, the total fee would surpass the total payment value.

A diagram for regular intermediated payments can be seen in simplified form in FIG. 1. Users 100 perform payments to one or more vendors 101, intermediated by an intermediary payment system 102. A primary payment system 103 transfers values from users to vendors 104 and from users to the intermediary payment system 105. It is also possible the variation (not shown) where the primary payment system transfers values from vendors to the intermediary payment system, or other arrangements like this. Note that, in this figure, the arrows from users to receivers (i.e., to the vendors and the intermediary payment system) do not represent different payments transactions, but a single payment transaction where many receivers each receive a part of the paid amount. Of course, it is possible to look at this individual payment parts as separate complete payments; and indeed this is usually the way the primary payment system sees them. The many users in the figure could also represent the same user doing different payments.

To minimize transaction costs, many intermediary payment systems resort to a technique called payment aggregation (also less frequently called payment bundling), which means the intermediary payment system receives and holds the total payment amount on behalf of the vendors, and pays them only when the aggregated values reach a certain minimum amount or other condition. For example, if 100 users pay 20 cents each to a video website and to a content producer, the intermediary payment system could get all the money and pay the primary payment system's fees which, in this case, would be: 100×5 cents+1 dollar=6 dollars. Then, the intermediary payment system could pay the video website and the content producer with only two more payments that would cost 10 cents+0.7 dollar=1.07 dollars. The total paid fee is then 7.07 dollars. This is 35.4% of the total, instead of the 55% of the total when paid without aggregation.

The term "aggregation" can also mean that users pay a relatively large upfront amount (prepaid), or a later aggregated amount (post-paid) to the intermediary payment system. Amazon Payments permits direct prepaid and post-paid payment aggregation, but not intermediated payment aggregation (See Amazon FPS Aggregated Payments Quick Start, at https://payments.amazon.com/sdui/sdui/business?sn= devfps/aggregated). In other words, a main objective of Amazon Payments aggregation is to permit aggregation of payments for a single vendor, i.e., directly from the user to a vendor, and not from the user to an intermediary payment system and from there to many vendors. For this reason this kind of payment aggregation is less problematic, but does not address the problem of distributing many small payments to different vendors.

In short, what characterizes intermediated payment aggregation (hereafter "payment aggregation", "payment with aggregation", or simply "aggregation") is the fact that the intermediary payment system (or some entity in the intermediary payment system's behalf) receives, at some point, third-party amounts that are ultimately directed to other third-parties. This is especially so if there is no one-to-one correspondence between exact parts of amount transferred to and from the intermediary payment system.

A diagram illustrating payment aggregation can be seen in simplified form in FIG. 2. Users 200 perform payments ultimately directed to vendors 201, with the participation of an intermediary payment system 202. A primary payment system 203 transfers values from users to the intermediary payment system 204 and then from the intermediary payment system to the vendors 205. Of course, the many users in the figure could also represent the same user doing different payments.

U.S. Pat. No. 5,978,780 (Watson, "Integrated bill consolidation, payment aggregation, and settlement system", Nov. 2, 1999), for example, discusses "aggregating all of the obligation values that have been applied to purchaser's accounts that are destined for the same establishments". This patent and others disclose how to perform payment aggregation. But while aggregation seems to be a viable solution for the problem from an economical point of view, it is, unfortunately, against the rules of many primary payment systems, or requiring special government permits, or even illegal in some jurisdictions.

For example, aggregation is forbidden by VISA and MasterCard and also by most other credit card operators. The reason why they usually forbid aggregation is that the process actually hides the receiver from the primary payment system. When intermediary payment systems become authorized merchants for VISA and then let other merchants accept credit cards through their accounts, the merchants end up not having direct relationships with VISA, thus preventing risk management and other controls. The reason why merchants may prefer dealing with intermediary payment systems instead of VISA is that usually the intermediary makes the process easier and faster by not demanding all the documents that VISA would demand. Another reason is that some merchants want to trade goods or services forbidden by VISA rules, and may not be able to obtain a VISA merchant account anyway.

Note these are not the same reasons why aggregation is used for small payments, which is the reduction of fees, but both types of aggregation end up, perhaps unfairly, prohibited by credit card operator rules.

Another problem with aggregation is that it may also, in some cases, require special government permits because the intermediary payment system may hold third-party funds for some period of time. While these permits can usually be obtained, they may prove expensive and not viable for small companies. In some countries, intermediary payment systems may even be obliged to register as banks.

Another problem is that aggregation may create liability issues for the intermediary payment system. Suppose the intermediary payment system receives money from a user and subsequently pays a vendor. If there is a chargeback, i.e., if the user demands the money back because of fraud or other reasons, then the primary payment system will withdraw the money from the intermediary payment system, since the intermediary is the receiver from the primary payment system's perspective. The intermediary payment system will lose money unless it is able to also withdraw the money from the vendor. But this is not always possible without the vendor's permission, especially if the intermediary uses the primary payment system to pay the vendor. In other words, when aggregating, chargebacks get much more complicated for the intermediary payment system, since it cannot rely on the primary payment system to process them.

These payment aggregation problems affect many online payment systems, but especially micropayment systems (usually below 2 dollars) and small value payment systems (usually below 10 dollars) where fixed fees are proportionately more important and can strongly impact overall profitability. In spite of those problems, Watson and other patents and scientific articles that improve upon Watson teach how to improve aggregation, but not how to avoid aggregation.

ADVANTAGES

Accordingly, one or more embodiments of my payment arrangements may have one or more of the following advantages: (i) it is suited for online payment systems, specially micropayments and small value payments; (ii) it permits smaller total fees without resorting to aggregation; (iii) it permits total fees that may be even smaller than when doing aggregation; (iv) it permits the intermediary payment system to intermediate payments without holding third-party funds that would have to be subsequently transferred from the intermediary to other receivers; (v) it eliminates or reduces chargeback liability for the intermediary payment system; (vi) it can avoid payment aggregation and its associated problems, while still saving fees.

The listed advantages should not to be used to limit any aspect of any embodiment, since, in some embodiments, not all of these advantages must be present, and the embodiments may be used in combination with other techniques that relate to different payment advantages and disadvantages. Also, other advantages exist without being mentioned or are discussed within the rest of this text.

SUMMARY

This Summary introduces concepts in a simplified form that are further described below in the Detailed Description. This Summary is not intended to identify key or essential features of the claimed subject matter, nor is it intended to be used as an aid in determining the scope of the claimed subject matter.

In one embodiment, an intermediary payment system maintains records of unpaid amounts for potential receivers, and determines one or more potential receivers, but not all of them, to become effective receivers of a nominal amount. The primary payment system transfers amounts from the user and to receivers. The intermediary payment system reduces records of unpaid amounts for effective receivers, and raises records of unpaid amounts for potential receivers. A computer-implemented method, in different embodiments, is provided to construct on-line payments without resorting to payment aggregation. The embodiments permit smaller total fees; permit the intermediary payment system to intermediate payments without holding third-party funds; and permit eliminating or reducing chargeback liability.

DRAWINGS

The features and advantages of the embodiments will be better understood from the Detailed Description read in light of the accompanying drawings, which are briefly described just below and are more fully described later:

FIG. 4 is a diagram illustrating, in simplified form, two transactions according to some embodiments where unpaid values can become negative for Receivers.

FIG. 5 is a diagram that shows three different results for computer simulations after a high number of random transactions, which occur with the same parameters but in different orders, according to embodiments where unpaid values can become negative for Receivers.

FIG. 6 is a diagram illustrating, in simplified form, two transactions according to some embodiments where unpaid values can only become negative for trusted Receivers.

FIG. 7 is a diagram that shows three different results for computer simulations after a high number of random transactions, which occur with the same parameters but in different orders, according to embodiments where unpaid values can only become negative for trusted Receivers.

Figure 1:
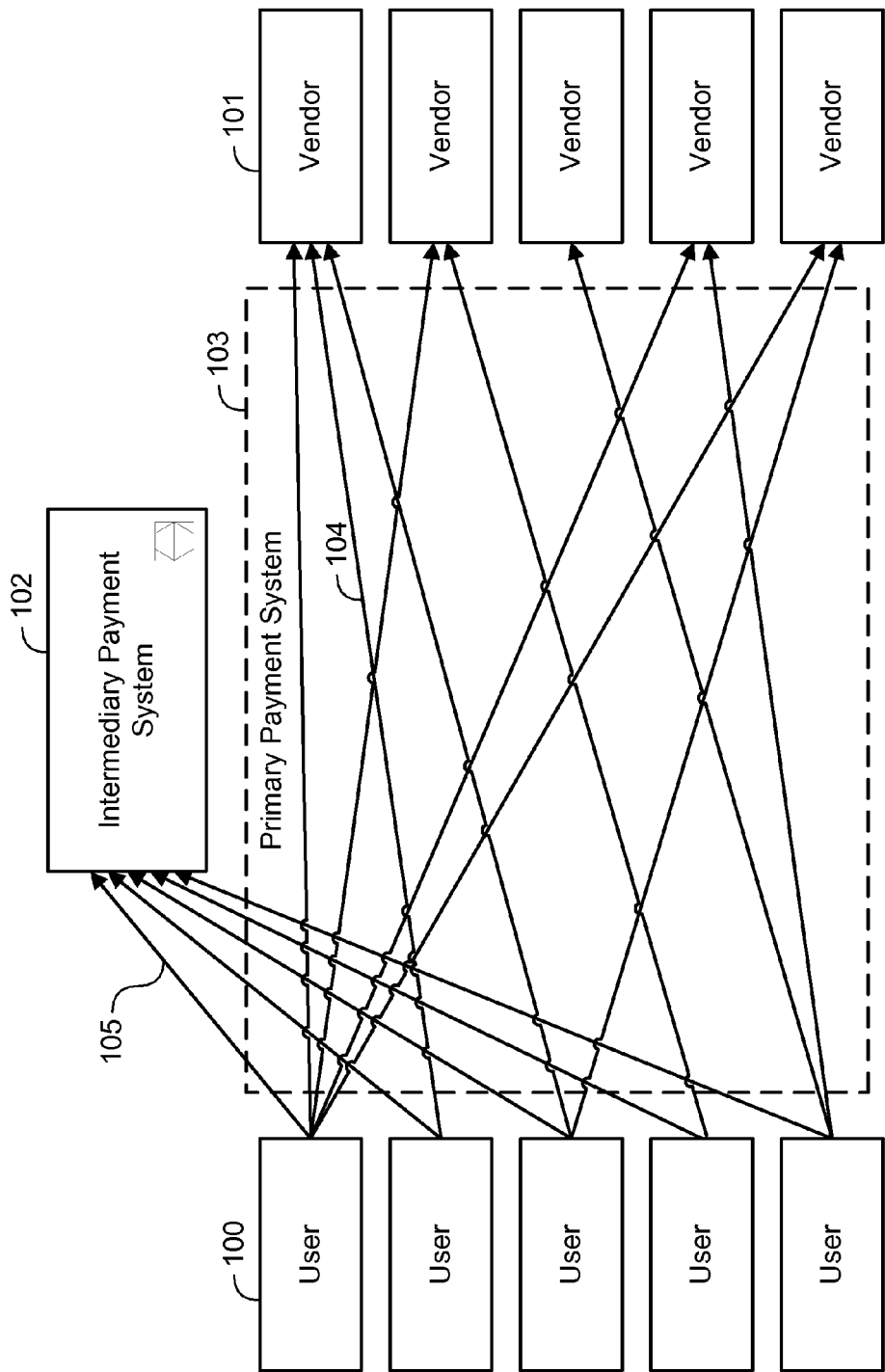
FIG. 1 is a prior-art diagram illustrating some simplified aspects of regular payments.
Figure 2:
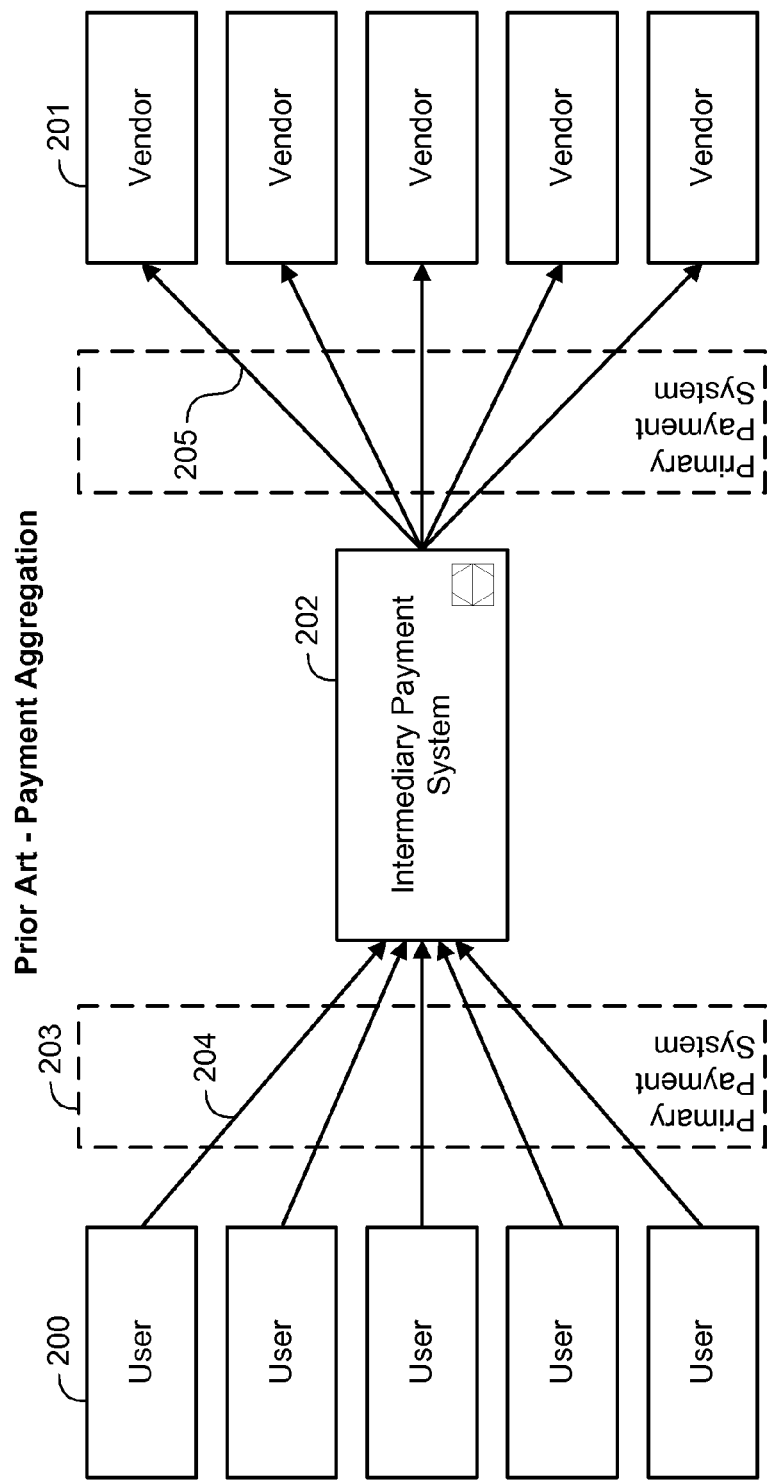
FIG. 2 is a prior-art diagram illustrating some simplified aspects of how payment aggregation works.

FIGS. 8A, 8B, 8C, and 8D are the listing of a program that implements embodiments and computer simulations described in this text.

The same numbers are used throughout the disclosure and figures to reference the same steps, structures and features. For the sake of brevity, conventional data networking, application development, components of the individual operating components of the systems and other functional aspects of the systems are not described in detail since these are well known to those skilled in the art. Many alternative or additional functional relationships or physical connections may be present in a practical system.

DETAILED DESCRIPTION

First Embodiment

Usually, four parties or more participate on a regular intermediated Internet payment operation: the "User" (Sender, Customer, Buyer, Spender, Payer, or Purchaser), the "Vendor" (Merchants, Sellers, Earners, or Payees), the "Intermediary" (Intermediary Payment System, Broker or Guarantor), and the "Primary" (Primary Payment System, Credit Card Operator, Bank or other).

The term "Receiver", as used in this text, refers to a Vendor or to the Intermediary. To simplify things, the present text refers to the User as a person, and to the other parties as separate entities, usually companies. The Vendors (one or more) are the ones that created, licensed, own or otherwise control or hold rights regarding the content, goods or services. The Primary is the trusted party who has the means to debit the User and credit the Receiver, and the Intermediary is the trusted party who has the means to instruct the Primary to debit the User and credit the Vendor.

To avoid payment aggregation, the Intermediary must guarantee that all intermediated payments performed by the Primary, from the User to the Vendors, are performed without an intermediary step where third-party funds are received and aggregated by the Intermediary (or by someone in the Intermediary's behalf). Accordingly, the Intermediary should not also have to perform a second or more payment specifically to transfer the total or parts of the aggregated payments to Vendors or others. Let us see how to avoid payment aggregation.

A payment transaction will be conducted between the User, who is paying an amount to obtain products or services, The Primary Payment System (called Primary for short), and potential Receivers. The word "potential" means they are each meant to receive a part of the nominal amount, but they may not receive their theoretical part during the current payment transaction. The potential Receivers are usually Vendors and the Intermediary Payment System (called Intermediary for short).

In some payments there is only a single Vendor, but it is also common to have many Vendors, especially in User-Generated-Content websites. E.g., if YouTube were to sell videos, there could be two, three or more Vendors: YouTube itself, the video director, the actors and so on. But even on payments where there is a single Vendor there are two potential Receivers: the Vendor and the Intermediary, unless the Intermediary itself is not charging any fees, which is not usually the case.

Since there is usually more than one Receiver, they should split the nominal amount according to conventions, division business rules, which can be simple or complex. In other words, according to the division business rules there is a part of the nominal amount that each Receiver "should receive". It really doesn't matter for this discussion what are the division business rules, but the Intermediary must know them or get informed about them in some way. Usually, the division business rules state a percentage for each Receiver, or a fixed fee for each Receiver, or a combination of both. E.g., the division business rule may state that the Intermediary will get 15% of the nominal amount, while two Vendors will split the rest, 60% to 40%.

We call effective Receivers the subset of potential Receivers that will effectively receive a part of the payment during the current payment transaction. Potential Receivers (the ones that "should" receive) who did not become effective Receivers are considered unpaid, and the Intermediary maintains records of unpaid amounts for the potential Receivers. The records of unpaid amounts represent credit for underpaid potential Receivers (i.e., these potential Receivers received less than they should), and represent debit for overpaid potential Receivers (i.e., these potential Receivers received more than they should). These records can be stored in databases, files (disk memory), in cache memory, in the cloud, or in other suitable form.

The Intermediary, by using its data processor and memory hardware, will use a calculation rule to choose one or more of the potential Receivers to become the effective Receivers of the nominal amount. The number of effective Receivers should be at least one, of course, but less than the total number of potential Receivers, even when the nominal amount is sufficient to pay all potential Receivers. The reason is that each added effective Receiver usually means extra fees charged by the Primary. If we choose the number of effective Receivers to be equal to the total number of potential Receivers, we arrive at the trivial case, i.e., we are doing the regular payment operation and paying the maximum amount of fees. We are saving fees whenever the number of effective Receivers is less than the total number of potential Receivers, but the savings are maximized when the number of effective Receivers is a single one. Also remember that the single effective Receiver can even be the Intermediary itself.

The calculation rule mentioned above can be very flexible, the only requirement being that it should tend to minimize the absolute value (i.e., the modulus) of the unpaid amount of each potential Receiver, or that it should tend to minimize the time it takes for the unpaid amount to be paid for each potential Receiver. The word "tend" means very specifically that it is not necessary that the unpaid amounts get minimized after each transaction, but only that there should be a general trend towards them getting smaller and smaller, in comparison with the total amounts paid, after many payment transactions. In other words, no unpaid amounts should rise unbounded or to unreasonable values, or become unpaid forever or for unreasonable time spans, since Receivers will not accept that their payments become unpaid for unreasonable amounts or time spans. What is considered unreasonable and what is considered many payment transactions is the Intermediary's decision, but the minimum common denominator is that some form of minimization concern should always apply. Note we shouldn't tend to minimize the sum of all the recorded unpaid amounts, since this is always zero (when some Receivers are underpaid some other Receivers are overpaid and the result is zero), but to minimize each unpaid amount for each potential Receiver individually.

The Primary will then transfer the amount from the User (i.e., debit) and transfer the nominal amount to the effective Receivers (i.e., credit). Depending on the way the Primary or the Intermediary operate, this transferring can occur indirectly, for example, by the amounts passing or transferring through some other accounts or third-parties, but it can also be a direct transfer from the User to the effective Receivers. The Intermediary should, accordingly, reduce (record as debit) the records of unpaid amounts for each effective Receiver, by recording the part of nominal amount received by each of these effective Receivers. In the special (and usually recommended) case where there is a single effective Receiver, this means the Intermediary should reduce this Receiver's record of unpaid amount by recording the entire nominal amount (since this sole Receiver received it all). The Intermediary should also raise (record as credit), for each potential Receiver (including the effective Receiver), their records of unpaid amounts, by recording the part of nominal amount that each potential Receiver should have received.

The records recorded by the Intermediary guarantee that it knows which Receivers received more than they should, or less than they should, and by what amounts, so that these records can be compensated during future payments. And we know these records will be compensated sooner or later, in one way or another, because, as we have already seen, the calculation rule tends to minimize the unpaid amounts or the time it takes for the unpaid amounts to be paid.

Figure 3:
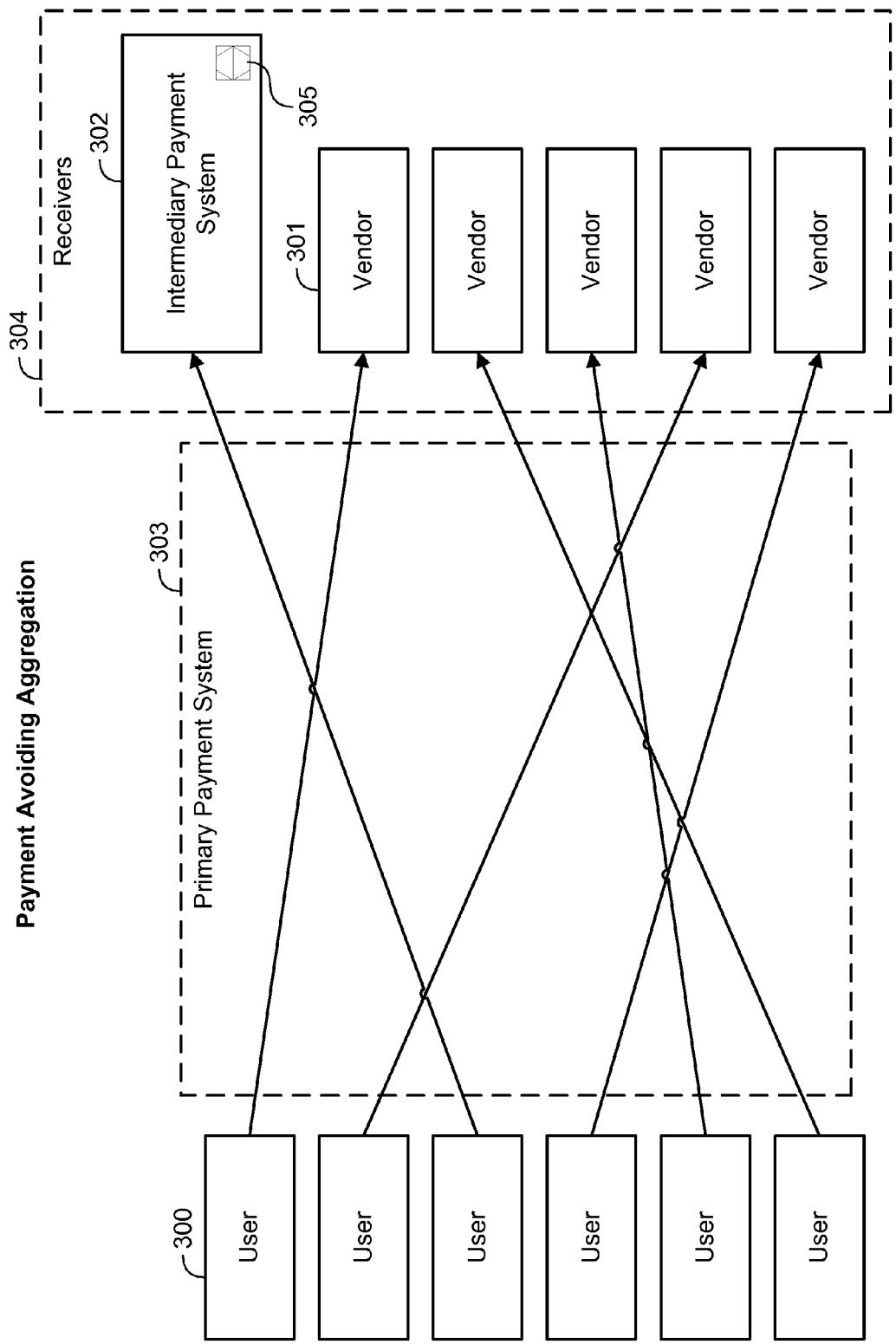
FIG. 3 is a diagram illustrating, in simplified form, some aspects of how payment transactions work, according to the some of the embodiments.

FIG. 3 is a diagram illustrating one embodiment where various payment transactions avoiding aggregation as discussed above can be implemented. A User or a plurality of Users 300 perform payments ultimately directed to Vendors 301, with the participation of an Intermediary 302, including its data processor and memory hardware 305. The Primary 303 transfers values from Users 300 to Receivers 304. This embodiment concerns the special case of a single effective Receiver per payment but, as discussed, this does not imply that there is only a single potential Receiver per payment. This figure could, in fact, be representing the same number of potential Receivers shown in FIG. 1. Note that the many Users in the figure could also represent the same User doing different payments. Also, although only a few payment transactions are shown, usually there are a much larger number.

MORE DETAILS AND DEFINITIONS

The terms "Intermediary", "Primary" and "Vendor" are to be considered interchangeable in some situations where the Primary performs some of the tasks that are usually performed by the Intermediary, or when the Primary or the Intermediary perform some of the tasks that are usually performed by the Vendor. For example, in most situations, the Primary provides or runs the software technology to aid the Intermediary process, so the expression "the Primary transfers" may in fact mean that "the Intermediary transfers", and vice versa. Also, some payment systems can be Intermediaries or Primaries depending on the context. For example, while PayPal can be considered a Primary Payment System in relation to an Intermediary that uses PayPal technology, PayPal can also be an Intermediary in relation to a credit card company (the Primary, here) that it uses to transfer funds.

Also, when referencing parties in the present text, in reality the computers, mobile phones, PDAs, browser software, server software, or other piece of software and hardware that perform the specified action under the control of each party. For example, the expression "the Intermediary maintains records", depending on the context, means "the web server computer running some software code records information in its database server computer", or the like. This simplification is common in technical texts, including patents, and it helps understanding and using the embodiments.

When the User pays an amount, the Primary usually discounts a fee from this amount. The government or other third-parties may also discounts fees, taxes, or other values from this amount. Broadly, the amount that actually matters to the Receivers, usually the full discounted amount, is called the "nominal amount", i.e., the part of the amount that the potential Receivers should receive. Note the amount can be discounted before or after the transaction, directly from the User, from the Vendor, or from the Intermediary, or the applicable fees and taxes may be split among them. In any case, the nominal amount should be considered the amount that matters to Vendors or to the Intermediary, according to the division business rules of the payments involved. For example, if the User pays a total amount of 1 dollar to be split among to two Vendors, and the Primary charges 5% plus 5 cents for each, the nominal amount may be considered 95% of the total amount minus 10 cents, which is 85 cents. Also, adding or removing parts of amount, or fees, or taxes, to what is here called amount, or nominal amount, does not depart from the spirit and scope of the method, and is to be considered covered by the definitions of amount and nominal amount herein.

The term "content" is the digital products or services in a communications network. Therefore, content may include texts, images, music, data streams, videos, email, chat, news, financial information, reference information, voice over IP, blogs, social networks, discussion groups, software downloads, search engines, communications services, computer software, electronic games, digital maps, electronic tickets and receipts, and whatever other kind of digital information that can be communicated electronically. The User may want to be allowed to download, upload, view, share, alter, interact with, or otherwise use the content.

In this text, when we talk about "unpaid amounts", we use the convention that positive values are Receiver's credit. So, for example, if the unpaid amount is 4 dollars (positive amount) we mean that the Receiver should be paid 4 dollars. If the unpaid amount is minus 4 dollars (negative value), we mean that the Receiver has been paid 4 dollars more than it should. We may also say "record as credit" to express raising unpaid amounts, and "record as debit" to express reducing unpaid amounts. For example, if the Receiver should be paid 4 dollars and we record as debit 1 dollar, the Receiver should now be paid only 3 dollars.

Note that, both in the Description and in the Claims it is possible to represent, record, or calculate values with opposite signs (positive to negative or vice versa), or change addition to subtraction and vice versa, or change reduce to increase, or use some other mathematical transformation, operation or convention. Doing so does not depart from the spirit and scope of the method. In other words, choosing another mathematical convention, recording information in some other form, or doing calculations in different ways with different formulae but with the same principles in mind, then it is still covered by the Description and the Claims. Specifically, when we say "said second result greater than zero or equal to zero" we mean this is when using the same conventions explained here, and it is implicitly included in case the calculations are performed with different conventions or other mathematical transformation or formulae are applied, as one skilled in the art will be able to determine without difficulty. For example, if we add 4 units to the second result, the previous text could be read "said second result greater than four or equal to four" but, better yet, we should consider that the second result is in fact implicitly calculated when we do the calculation adding 4 units.

In this text, when we use the expression "should receive", we mean it is the intention of parties that the Receiver should ultimately receive these amounts in accordance with the division business rules, and we do not mean that the receiver must necessarily receive these amounts immediately, within the current payment transaction.

It must be noted that, as used herein and in the appended claims, the singular forms "a", "an" and "the" include plural reference unless the context clearly dictates otherwise.

Embodiments can be used in the Internet, but may also be used in any other electronic communications network, such as an extranet, a satellite communications network, a mobile or wireless communications network, a local area network (LAN), a wide area network (WAN), or any other suitable network. All discussed embodiments can be performed by desktop computers, but may also be performed by any other programmable electronic device, such a laptop, a smartphone or other a cellular or mobile phone, a notebook, a netbook, a point of sale device, a personal digital assistant, a kiosk, networked or linked devices, or any other suitable electronic device, since all these are different forms of electronic computers.

Embodiments with Efficient Calculation Rules

As already discussed, the Intermediary uses a calculation rule to choose one or more of the potential Receivers to become the effective Receivers of the nominal amount. Also as already discussed, this calculation rule can be very flexible, the only requirement being that it should tend to minimize the absolute value (i.e., the modulus) of the unpaid amount for each potential Receiver, or that it should tend to minimize the time it takes for the unpaid amount to be paid for each potential Receiver. Every trivial calculation rule that is even slightly better in doing this than simply choosing the effective Receivers by chance will work with the present method, but can lead to smaller savings, or to large unpaid amounts, or to long time spans where Receivers await unpaid. Let us now explore some calculation rules, in increased degree of complexity, which deliver very efficient results.

An efficient yet still simple calculation rule is to compare the unpaid amounts of each potential Receiver, and choose as effective Receivers a few of them with the highest unpaid amounts. Better yet, we can choose only the single Receiver with the highest unpaid amount (if there is a tie we can choose either or the one who is unpaid for the longest time span). But this calculation rule doesn't take into consideration the nominal amount being paid at the current payment transaction, which it should.

A better calculation rule, then, is to calculate results by adding, for each potential Receiver, the part of the nominal amount that this potential Receiver should receive, plus its unpaid amount. The effective Receivers will then become the potential Receivers (or the single potential Receiver) that have the highest of these calculated results. Note, when we use the term "should receive" we mean that the potential Receiver may not receive the part of nominal amount during the current payment (by becoming an effective Receiver), but since the potential Receiver is entitled to receive this part of nominal amount, that it will become an "unpaid amount" in case it is not received. This calculation rule is called the "unsafe calculation rule", and is exemplified in FIGS. 4 and 5 (later explained).

However, when Receivers are paid an amount larger than their unpaid amount, i.e., when their unpaid amounts become negative (by our convention), then the Receiver has in fact received more than it should. This usually presents no problem when the Receiver is honest and is always participating as a potential Receiver in further payments, since the extra amount it received will be compensated in future payments. However, if the Receiver gets involved in fraudulent payments, or if the Receiver is somehow removed from the market and does not participate in future payments, then the extra amount it received may represent a liability to the Intermediary.

To avoid that and reduce risk to the Intermediary, the previous calculation rule can be further improved by also calculating, for each potential Receiver, apart from the first result already explained, a second result by subtracting the entire nominal amount from the unpaid amount of this potential Receiver. The effective Receivers will then become the potential Receivers (or the single potential Receiver) that have the highest first results but that also have the second result greater than or equal to zero. By using this calculation rule we guarantee that no Receivers will be paid more than they should at any moment.

In the case where all potential Receivers have the second result negative, then at least one Receiver will have to be paid more than it should (i.e., it will be overpaid if paid the entire nominal amount). If any or some of the potential Receivers are trusted by the Intermediary, these may become effective Receivers without offering risk. In other words, trusted Receivers are the ones that the Intermediary knows enough of to be sure (or reasonably sure) that they will not get involved in fraudulent payments and will continue to participate in future payments. And in any payment transaction there is at least one trusted potential Receiver the Intermediary may use: itself (it trusts itself, and since the Intermediary should usually receive a fee, it is usually a potential Receiver). This calculation rule is called the "safe calculation rule", and is exemplified in FIGS. 6 and 7 (later explained). Embodiments using this calculation rule may be preferred in many common situations, although other embodiments may be preferred depending on market conditions.

Now, let us create another interesting calculation rule by substituting the first calculation to a time based calculation. The Intermediary will calculate the amount of time each potential Receiver has been unpaid above a certain arbitrary amount, and will give priority to those that are unpaid for the longest time spans.

To further sophisticate this last calculation rule we may calculate not only the unpaid time spans, but the unpaid time spans for each part of the unpaid amount. The unpaid amount is probably composed by different unpaid amounts that were added over time. But 10 cents unpaid for 10 months may be less important than 10 dollars unpaid for 1 month. So these time spans would be weighted by their corresponding amounts, and the first result would be the sum of the weighted time spans.

Another way to take into consideration both amounts and time is to calculate the net present value of the unpaid amounts (see http://en.wikipedia.org/wiki/Net_present_value), but with negative discount rates, resulting that the old amounts will be more valuable per dollar than the recent ones. The first result would then be the net present value of the unpaid amounts for each potential Receiver.

As to further clarify and exemplify how to make and use embodiments like these, refer to FIG. 4. This figure shows a computer simulation of two consecutive payments, using an embodiment with the already explained "unsafe calculation rule", for a single effective Receiver, from a set of 10 Receivers (9 Vendors and the Intermediary). In this simulation, each transaction has at least two potential Receivers (one Vendor and the Intermediary) and up to five potential Receivers (four Vendors and the Intermediary). The Intermediary always receives 15% of the nominal amount, and the other Receivers split the rest according to division business rules established before each the payment transaction starts.

Each Receiver starts with zero unpaid and zero paid amounts for the first payment transaction considered, called Transaction-1. The nominal amount 400 for Transaction-1 in this example is $1.10. As we have seen, the set of potential Receivers and the division business rules are given. The nominal amount is then divided into parts of nominal amount 401 according to the division business rules 402, which in this example result in $0.17 (15%) for the Intermediary Payment System (IPS, the Receiver 0), $0.69 for the Receiver 1 and $0.24 for the Receiver 8.

These parts of nominal amount that each potential Receiver should receive are added to the current unpaid amounts (which are all zero in the beginning of the Transaction-1) for these Receivers, and we obtain the "first" results line 403. The potential Receiver with the highest first result will become the effective Receiver. In this example this is Receiver 1 404, which gets the entire nominal amount 400, as we can see in the "paid" line 405. The parts of nominal amount 401 for each potential Receiver are added to the "unpaid" line 406, except for the effective Receiver, which will have added its part of nominal amount minus the entire nominal amount, resulting in the effective Receiver's unpaid amount 407 of −$0.41. The minus sign means Receiver 1 received more than it should. It should have received $0.69 but received $1.10, which is $0.41 more than it should.

Remember the minus sign here is just a convention, since we could have represented amounts with opposite signs or using other mathematical conventions or notations, or we could have a separate line for "paid more than should" amounts. All these possibilities represent the same thing.

Note the "unpaid" line 406 lists the accumulated unpaid amounts at the end of the current payment transaction. The sum of unpaid amounts for all Receivers in a line will be zero (also a result of our conventions). Also note the "paid" line 405 lists the accumulated paid amounts at the end of the current payment transaction.

Now we may process Transaction-2. The nominal amount 408 for Transaction-2 in this example is $1.20. Again, the new set of potential Receivers and division business rules are given. The nominal amount is then divided into parts of nominal amount 409 according to the division business rules 410, which in this example result in $0.18 (15%) for the Intermediary Payment System, $0.35 for the Receiver 1, $0.11 for the Receiver 3, $0.33 for the Receiver 5 and $0.23 for the Receiver 8.

These parts of nominal amount for each potential Receiver are added to the current unpaid amounts for these Receivers, and we obtain the "first" results line 411. Note that the current unpaid amounts at this point, i.e., the unpaid amounts at the beginning of the Transaction-2, are the same as the unpaid amounts at the end of Transaction-1, 406. Thus, this time, not all current unpaid amounts are zero. The potential Receiver with the highest first result will become the effective Receiver. In this example this is Receiver-8, 412. Note that if this was the first payment transaction to be performed (i.e., if Transaction-1 did not exist), the highest first result would have been Receiver-1 404 instead.

Receiver-8, 412, then, gets the entire nominal amount 408, as we can see in the "paid" line 413. The parts of nominal amount 409 for each potential Receiver are added to the "unpaid" line 414, except for the effective Receiver, which will have added its part of nominal amount minus the entire nominal amount, resulting in the effective Receiver's unpaid amount 415 of −$0.73.

As it happens, the effective Receiver calculated in Transaction-2 depended upon the exact unpaid amounts resulted from the previous Transaction-1 (Receiver-8 instead of Receiver-1). This illustrates the fact that the exact outcomes of payment transactions become dependent upon each other. Nevertheless, unpaid amounts tend to compensate after many regular payment transactions, so that in the long term it will be almost "as if" they were independent. In other words, the unpaid amounts will tend to get smaller and smaller (proportionately to the accumulated paid amounts, but not in absolute terms) in comparison to the ever growing paid amounts. For example, FIG. 5 shows 3 different results for computer simulations after 5,000 random Transactions with nominal amounts between $0.20 and $2.00, which occur with the same parameters (same nominal amounts, receivers and division business rules) but in different orders. The "paid" lines for each simulation (500, 501 and 502) are similar, and the unpaid amounts are small.

Now, refer to FIG. 6. This figure shows a computer simulation for two consecutive payments, just like the previous example, but now using an embodiment with the already explained "safe calculation rule", and for a single effective Receiver. The most important difference here is that only trusted Receivers will ever have negative unpaid amounts.

Taking Transaction-3, 600, as given, let's see details of Transaction-4, 601. The nominal amount 602 is divided into parts of nominal amount 603 according to the division business rules 604. As we have seen, the division business rules are given. The "first" results line 606 for Transaction 4 is obtained by adding the parts of nominal amount 603 to the unpaid amounts at the beginning of Transaction 4, which can be read from the "unpaid" line of Transaction 3, 605. If we were using the unsafe calculation rule, the potential Receiver with the highest first result, Receiver 8 in this example 607, would become the effective Receiver. However, this is not the case since we should now calculate the "second" results line 608 by subtracting, for each potential Receiver, the entire nominal amount 602 from the current unpaid amount of each potential Receiver 605. As we can see at the "second" results line 608, no potential Receivers have the second result greater or equal than zero, so the effective Receiver should be, instead, a trusted Receiver. In this example there is only one trusted Receiver, the Intermediary 609 itself, that gets the entire nominal amount, as we can see in the "paid" line 610. The parts of nominal amount 603 for each potential Receiver are then added to the "unpaid" line 611, except for the effective Receiver that will have added its part of nominal amount minus the nominal amount 602, resulting in the effective Receiver's unpaid amount 612.

Once again, the effective Receiver of next transactions depends upon the exact unpaid amounts from previous transactions, and once again the unpaid amounts will tend to compensate, so that, in the long term, it will be as if they were independent. FIG. 7 shows the same computer simulations of FIG. 5 after 5,000 random Transactions each, but using the safe calculation rule. The "paid" lines for each simulation (700, 701 and 702) are, again, similar, and the unpaid amounts are small. The only big difference—the one that makes the method "safe"—is that no unpaid amounts are ever negative, except for the trusted Receiver of course.

To further clarify how to make and use the embodiments, FIGS. 8A, 8B, 8C and 8D contain a listing of a program written in HTML and JavaScript that implements them, and was used to obtain the computer simulation results shown in FIGS. 4, 5, 6 and 7. The code is of a single webpage which will run automatically as soon as the webpage is directly opened in browsers like Firefox, Safari or Google Chrome. Although the programming language used in this code is JavaScript, it translates easily to other suitable programming languages like Java, C, C++, C#, Python, PHP, Perl and many other, as those skilled in the art will readily realize.

Best Results Analysis

All previous calculation rules can be used to determine one or more effective Receivers out of the set of potential Receivers. But the number of effective Receivers should be less than the number of potential Receivers for the method to produce savings. All the calculation rules above will yield the best savings when the effective Receiver consists of a single one that receives the nominal amount in its entirety, unless of course, the Primary allows two or more Receivers without charging more fees (which is not usually the case).

Various conditions impact benefits. A first is the size of the nominal amount that is paid. Since the method produces unpaid amounts, it may be unreasonable to expect that the Receivers will cope with having large unpaid amounts. The ideal thresholds depend on market conditions, but we may generally say the method is ideal for payments below 2 dollars and almost ideal for payments below 10 dollars. Above that amount the Intermediary should probably consult the Receivers or do some research to find out if they are willing to accept the larger unpaid amounts.

A second condition is if there is a fixed (or not proportional) amount on the fees charged by the Primary. For example, if the Primary Payment System fees contain no fixed (or not proportional) amounts, but only proportional amounts, say 5% of transacted values, then it doesn't make a difference the number of effective Receivers for the payment transaction. Only when the Primary fees contain fixed (or not proportional) amounts, say 5 cents per effective Receiver, we can save by reducing the number of fixed amounts paid.

A third condition is the size of the fixed (or not proportional) amount on the fees charged by the Primary, in relation to the size of the entire payment. If the fixed fee is very small in comparison, say 5 cents out of 50 dollars, then it doesn't matter much if this fee will be paid a number of times more.

A fourth condition is the size of the fixed (or not proportional) amount on the fees charged by the Primary, in relation to the size of the part of the nominal amount received by each potential Receiver. In other words, even if the fixed fee is very small in comparison to the entire payment, say 5 cents out of 50 dollars, it may not be small in comparison with the part received by one of the Receivers. For example, if the Intermediary charges only 1% of payments, it gets 50 cents out of 50 dollars. The 5 cents fee is now 10% of what the Intermediary gets, and it makes a difference reducing the number of fixed fees.

To even further clarify this point, let us calculate how much is saved in fees when the Primary charges 5 cents plus 5% of payments, for the example in FIG. 7, already discussed. We have 5,000 transactions where the total accumulated nominal amount is $5305.50. Since in this example we have a single effective Receiver in each transaction, the total amount before fees is $5847.90 (Since 5847.90−5000×0.05−5847.90×0.05= 5305.50), and the total amount of fees is $542.40. Now let us calculate the fees for regular payments without using the method. Using the average number of 3 Receivers per transaction, we would have 15 cents plus 5% of fees per transaction, resulting in $1042.39 (Since 5000×0.15+5847.90× 0.05=1042.39), almost double the fees than when using the method.

As discussed, to minimize transaction costs many Intermediary Payment Systems resort to the aggregation technique, which means the Intermediary receives and holds payment amounts on the behalf of Vendors, and pays them only when the aggregated values reach a certain minimum amount or some other suitable rule. So we may also compare the calculated fees of the example above with the fees for payment systems that use the aggregation technique. For that we need to suppose when the Intermediary pays the aggregated amounts. The best case for the Intermediary in the example would be to accumulate all payments and pay the Receivers only after the 5,000 transactions are done. However, in practice the Receivers will not accept that the Intermediary holds such large amounts and for such a large time span. For the comparison to be fair, then, let us consider that the Intermediary may pay each Receiver whenever the Receiver reaches 2 dollars of unpaid amount. This would result in approximately 2,652 payments from the Intermediary to the Receivers (Since 5303.50/2=2651.75) plus the other 5,000 payments from Users to the Intermediary. Fees will then be $674.99 (Since 7,652×0.05+5847.90×0.05=674.99).

As we can see, in this example, fees for the payments with aggregation ($674.99) are less than the fees for regular payments ($1042.39) but more than the fees when using the present method ($542.40). In particular, the method saves $132.59, almost 20%, in comparison with payments with aggregation. This, of course, is not the only advantage in relation to the payments using the aggregation technique since, as we have already discussed, payment aggregation is usually against the rules of many primary payment systems, or requires special government permits, or is illegal in some jurisdictions, or generates chargeback difficulties or liabilities.

CONCLUSION

The various embodiments are suited for online payment systems, specially micropayments and small value payments. They allow the construction of very economic payment systems that permit smaller total fees than when doing aggregation, and without resorting to aggregation. They permit the intermediary payment system to intermediate payments without holding third-party funds that would have to be subsequently transferred from the intermediary to other receivers. They eliminate or reduce chargeback liability for the intermediary payment system. In other words, they can avoid payment aggregation and its associated problems, while still saving fees.

RAMIFICATIONS

While all the exemplary embodiments in the present text are described in sufficient detail to enable those skilled in the art to make and use them, other embodiments may be realized, and logical and structural changes may be made, without departing from the spirit and scope of the method.

For example, there can be, simultaneously, a plurality of Users, Intermediaries, and Primaries. Or the User can also be a Vendor (in case of user-generated-content websites for example). Or the Intermediary and the Vendor can be the same entity, for example, if a website runs a payment system for its own Users. Or more than one company can each perform a part of the tasks that constitute what is here called the Intermediary. Or the Vendor can sell authorized content of others, or some content may belong to more than one Vendor. Therefore, the present text refers to these parties in a simplified manner, for explanation reasons, and many variations of the definition of the terms User, Vendor, Intermediary, and Primary are possible.

In this discussion, steps were presented that carry out the payment transaction according to some embodiments. However, more communications can be included between parties, or between parties and other entities, or some communication orders can be altered. Any such modifications in the information flow do not depart from the spirit and scope of the method. For example, there can be additional communications between the Intermediary and the Primary to check which Receivers are trusted; or the number of effective Receivers can be adapted in each payment according to the nominal amount or according to the part of nominal amount that each Receiver will get, possibly comparing them to the Primary fees. Receivers that have received lots of payments in the past can also automatically be considered trusted Receivers; or there can be extra communications between parts to check exchange rates that will result in extra fees if the price to be paid by the User is in a different currency than the Receiver's currency; or there can be extra steps in calculation rules to cope with any other information that is necessary for some specific functionality of the payment system; or the term "payment transaction" can be considered as composed of the many payment transactions, one for each Receiver, or the term can be considered as encompassing all money transfers for the many Receivers.

Although usually the effective Receivers are chosen among the potential Receivers of the current payment transaction, in some embodiments the effective Receivers can be chosen among not only the potential Receivers of the current payment, but among the potential Receivers of other payments. Note this may not be acceptable to some, but not all Primary Payment Systems.

As we have seen, the calculation rule to be used can be very flexible, the only requirement being that it should tend to minimize the unpaid amount for the each potential Receiver, or that it should tend to minimize the time it takes for the unpaid amount to be paid for each potential Receiver. In other words, statistically, the chance that, next time, a particular potential Receiver will be chosen as effective Receiver should tend to increase each time this potential Receiver is not chosen. This is the very broad definition of the word "minimize", a very generic requirement, and encompasses many simple and trivial calculation rules that one skilled in the art will be able to determine without further explanation, e.g.: "Choose as effective receivers all the receivers that are unpaid." If inefficient calculations like this are used, this does not depart from the spirit and scope of the method, since the method will still work, although inefficiently.

Even though in some embodiments the calculation rules can remain the same between different payment transactions, calculations rules may also vary between each payment transaction. It is also possible to apply more than one calculation rule to the same transaction and choose among them so that all calculation rules function, in practice, as parts of a single calculation rule.

Even though in some embodiments payment is performed fully online, payment can also be performed off-line or partly off-line (hybrid), for example, by the Intermediary registering the payment to perform it later, or combining present embodiments with other probabilistic techniques, or with digital cash, electronic tokens or other electronic representation of money.

Even though in some embodiments content can be sold and bought through micropayments or small payments, in other embodiments physical products can be sold and bought, or the payments may be in fact macro payments (normal valued payments).

SCOPE

Accordingly, the scope of the method should be determined, not by the embodiments illustrated, but by the appended claims, and their legal equivalents. Thus, the detailed description presented is for purposes of illustration only and should not be considered limiting.

I claim:

1. A computer-implemented method having steps which are accomplished on digital computers or mobile phones connected to an electronic communications network, for conducting online payment operations between a user who is paying an amount to obtain content or products or services, a primary payment system, and potential receivers comprising one or more vendors and an intermediary payment system, said method comprising:
   (a) maintaining, by said intermediary payment system comprising a data processor and a memory, records of unpaid amounts for said potential receivers, wherein said records of said unpaid amounts representing credit for underpaid potential receivers and debit for overpaid potential receivers, and wherein said unpaid amounts representing amounts that were not paid to some receivers but that were paid to other receivers;
   (b) choosing by using a calculation rule, by said intermediary payment system, at least one of said potential receivers and less than the total number of said potential receivers to become effective receivers of a nominal amount, even when said nominal amount is sufficient to pay all said potential receivers, and without needing further intervention from said user;
   (c) tending to minimize, by using said calculation rule, an absolute value of said unpaid amount for each of said potential receivers, or tending to minimize the time it takes for said unpaid amount to be paid for each of said potential receivers;
   (d) transferring, by said primary payment system, said amount from said user and transferring said nominal amount to said effective receivers, wherein said nominal amount comprising an amount that said potential receivers should receive and wherein said effective receivers include at least one of said potential receivers and less than the total number of said potential receivers;
   (e) recording for each of said effective receivers, by said intermediary payment system, said records of said unpaid amounts by recording as debit the part of said nominal amount received by said effective receiver; and
   (f) recording for each of said potential receivers, by said intermediary payment system, said records of said unpaid amounts by recording as credit the part of said nominal amount that said potential receiver should receive.

2. The method of claim 1 wherein said calculation rule includes comparing said unpaid amounts of each said potential receiver, and said effective receivers comprising the ones with the highest said unpaid amounts.

3. The method of claim 1 wherein said calculation rule includes calculating results by adding, for each said potential receiver, said part of said nominal amount that said potential receiver should receive plus said unpaid amount of said potential receiver, and said effective receivers comprising the potential receiver that has the highest said result.

4. The method of claim 1 wherein said calculation rule includes calculating first results by adding, for each said potential receiver, said part of said nominal amount that said potential receiver should receive plus said unpaid amount of said potential receiver; calculating second results by subtracting, for each said potential receiver, said nominal amount from said unpaid amount of said potential receiver; said effective receivers comprising the potential receiver that has the highest said first result of those selected from the group consisting of said potential receivers that have said second result greater than zero or equal to zero; and if no said receiver has said second result greater than zero or equal to zero, said effective receivers consisting of said intermediary payment system.

5. The method of claim 1 wherein said calculation rule includes calculating first results by adding, for each said potential receiver, said part of said nominal amount that said potential receiver should receive plus said unpaid amount of said potential receiver; calculating second results by subtracting, for each said potential receiver, said nominal amount from said unpaid amount of said potential receiver; said effective receivers comprising the potential receiver that has the highest said first result of those selected from the group consisting of said potential receivers that have said second result greater than zero or equal to zero; and if no said receiver has said second result greater than zero or equal to zero, said effective receivers comprising the potential receiver that has the highest said first result of those selected from the group consisting of said receivers that are trusted by said intermediary payment system.

6. The method of claim 1 wherein said calculation rule includes calculating first results comprising the unpaid time span above a certain arbitrary amount, for each said potential receiver; calculating second results by subtracting, for each said potential receiver, said nominal amount from said unpaid amount of said potential receiver; said effective receivers comprising the potential receiver that has the highest said first result of those selected from the group consisting of said potential receivers that have said second result greater than zero or equal to zero; and if no said receiver has said second result greater than zero or equal to zero, said effective receivers consisting of said intermediary payment system or receivers trusted by said intermediary payment system.

7. The method of claim 1 wherein said calculation rule includes calculating first results by adding, for each said potential receiver, the unpaid time span of each part of said potential receiver's unpaid amount, weighted by said unpaid amount; calculating second results by subtracting, for each said potential receiver, said nominal amount from said unpaid amount of said potential receiver; said effective receivers comprising the potential receiver that has the highest said first result of those selected from the group consisting of said potential receivers that have said second result greater than zero or equal to zero; and if no said receiver has said second result greater than zero or equal to zero, said effective receivers consisting of said intermediary payment system or receivers trusted by said intermediary payment system.

8. The method of claim 1 wherein said calculation rule includes calculating first results by adding, for each said potential receiver, the net present value of each part of said potential receiver's unpaid amount; calculating second results by subtracting, for each said potential receiver, said nominal amount from said unpaid amount of said potential receiver; said effective receivers comprising the potential receiver that has the highest said first result of those selected from the group consisting of said potential receivers that have said second result greater than zero or equal to zero; and if no said receiver has said second result greater than zero or equal to zero, said effective receivers consisting of said intermediary payment system or receivers trusted by said intermediary payment system.

9. The method of claim 1 wherein said primary payment system transferring said amount from said user and transferring said nominal amount to said effective receivers occurs as direct transfers from said user to said effective receivers.

10. The method of claim 1 wherein said effective receiver consists of a single receiver and wherein said single receiver receives said nominal amount of all potential receivers in its entirety.

11. The method of claim 1 wherein said amount consists of a micropayment.

12. The method of claim 1 wherein said amount consists of a small payment.

* * * * *